United States Patent
Oberhauser

(10) Patent No.: US 7,689,668 B2
(45) Date of Patent: Mar. 30, 2010

(54) METHOD AND ARRAY FOR TRANSPARENT, DYNAMIC PROVISION OF A WEB SERVICES

(75) Inventor: Roy Oberhauser, Aalen-Ebnat (DE)

(73) Assignee: Siemens Aktiengesellschaft, Munich (DE)

( * ) Notice: Subject to any disclaimer, the term of this patent is extended or adjusted under 35 U.S.C. 154(b) by 289 days.

(21) Appl. No.: 10/554,800

(22) PCT Filed: Apr. 20, 2004

(86) PCT No.: PCT/EP2004/050567

§ 371 (c)(1),
(2), (4) Date: Oct. 28, 2005

(87) PCT Pub. No.: WO2004/098124

PCT Pub. Date: Nov. 11, 2004

(65) Prior Publication Data

US 2007/0094364 A1    Apr. 26, 2007

(30) Foreign Application Priority Data

Apr. 30, 2003    (DE)    .................................. 10319528

(51) Int. Cl.
*G06F 15/16* (2006.01)
(52) U.S. Cl. ....................................................... 709/218
(58) Field of Classification Search ................. 709/203, 709/218, 224, 227, 229; 707/10
See application file for complete search history.

(56) References Cited

U.S. PATENT DOCUMENTS

| | | | |
|---|---|---|---|
| 5,774,668 A * | 6/1998 | Choquier et al. | 709/223 |
| 6,324,565 B1 * | 11/2001 | Holt, III | 709/203 |
| 7,016,973 B1 * | 3/2006 | Sibal et al. | 709/238 |
| 2002/0002602 A1 | 1/2002 | Vange et al. | |
| 2002/0178244 A1 * | 11/2002 | Brittenham et al. | 709/223 |
| 2002/0178254 A1 * | 11/2002 | Brittenham et al. | 709/224 |
| 2002/0198993 A1 | 12/2002 | Cudd et al. | |
| 2003/0041109 A1 | 2/2003 | Meloni et al. | |
| 2003/0110242 A1 * | 6/2003 | Brown et al. | 709/222 |
| 2003/0149889 A1 * | 8/2003 | Wookey et al. | 713/200 |
| 2004/0167960 A1 * | 8/2004 | Kinner et al. | 709/203 |
| 2005/0256952 A1 * | 11/2005 | Mouhanna et al. | 709/223 |

FOREIGN PATENT DOCUMENTS

EP    1 122 654 A    8/2001

(Continued)

OTHER PUBLICATIONS

Raghavan N. Srinivas "Java Web Start to the rescue", JavaWorld.com, Jul. 6, 2007. pp. 1-4.*

(Continued)

*Primary Examiner*—Salad Abdullahi
*Assistant Examiner*—Imad Hussain
(74) *Attorney, Agent, or Firm*—Harness, Dickey & Pierce, P.L.C.

(57) ABSTRACT

A method is disclosed for transparent, dynamic provision of Web services, wherein a request, for example, a SOAP (Simple Object Access Protocol) message of a Web service can be rerouted transparently to a local instance. If a local instance is not yet available, a dynamic provision of the Web service, downloading and local initiation of the Web service are made possible.

15 Claims, 3 Drawing Sheets

FOREIGN PATENT DOCUMENTS

WO          WO 99/32956          7/1999

OTHER PUBLICATIONS

Y. Charlie Hu et al. "Design and Scalability of NLS, a Scalable Naming and Location Service," Tech. Rep. TR01-381, Rice University, Jun. 2001. pp. 1-16.*

Pei Cao, Jin Zhang, and Kevin Beach. "Active Cache: Caching Dynamic Contents (Objects) on the Web Pages," Proceedings of the IFIP International Conference on Distributed Systems, 1998. pp. 1-9.* http://www.jini.org.

Steven Kim: "Java Web Start," Sep. 1, 2001, URL: http://www-128.ibm.com/developerworks/library/j-webstart.

John Zukowski: "Deploying Software with JNLP and Java Web Start," Aug. 2002, URL: http://java.sun.com/developer/technicalArticles/Programming/jnlp.

Raghavan N. Srinivas, "Java Web Start to the Rescue," Aug. 2001, URL:http://java.sun.com/developer/technicalArticles/JavaLP/javawebstart/.

Forms PCT/ISA/220, 210 and 237 (International Search Report).

Form PCT/IPEA/416 (International Preliminary Examination Report).

* cited by examiner

METHOD AND ARRAY FOR TRANSPARENT, DYNAMIC PROVISION OF A WEB SERVICES

This application is the national phase under 35 U.S.C. §371 of PCT International Application No. PCT/EP2004/050567 which has an International filing date of Apr. 20, 2004, which designated the United States of America and which claims priority on German Patent Application number DE 103 19 528.9 filed Apr. 30, 2003, the entire contents of which are hereby incorporated herein by reference.

FIELD

The invention generally relates to a method, with which a Web service from a service provider is provided for access at the request of a client computer. The Web service client is thus typically linked to the URL (Uniform Resource Locator) of the Web service, with this link existing in advance, or being detected with the aid of a registry, such as, for instance, via the standardized service discovery protocol for Web services, Universal Description, Discovery and Integration (UDDI) or WS-Inspection.

Another method for transparent, dynamic provision of services is known from JINI™ or the internet address http://www.jini.org, where services can also be downloaded and provided as purely locally defined services.

In some situations, it is desirable for Web services to be only made available or provided when the user wants to use them and then decides at the time for instance onto which machine they are to be provided (dynamic provisioning) so as to minimize the overhead for resource utilization.

Furthermore, it is sometimes desirable to provide the Web service locally, for instance for performance or reliability reasons in ad-hoc mobile user scenarios etc. As such, a Web service-based application could also operate at a purely local level.

This type of dynamic provision of previously set up components is already the prior art within application servers. Furthermore, an installation of Java applications based on a JNLP (Java Network Launch Protocol) is similarly known.

SUMMARY

An object underlying at least one embodiment of the invention is thus to specify a method for dynamic provision of Web services, the method executing transparently from the standpoint of the Web service client.

An object may be achieved according to at least one embodiment of the invention via the method and/or via the array.

At least one embodiment of the invention includes enabling a request, e.g. a SOAP (Simple Object Access Protocol) message, of a Web service to be rerouted transparently to a local instance via a proxy server. If a local instance is yet not available, a dynamic provision of the Web service, downloading and local initiation of the Web service are made possible. It is thereby possible to provide a Web service only when required, and to decide on the machine on which said Web service is to be provided in order to minimize the overheads for the resource utilization for instance, or to provide the Web service locally in ad-hoc mobile user scenarios for performance or reliability reasons.

BRIEF DESCRIPTION OF THE DRAWINGS

The invention is described in more detail below with reference to example embodiments shown in the drawings, in which.

DETAILED DESCRIPTION OF THE EXAMPLE EMBODIMENTS

Figure 1:
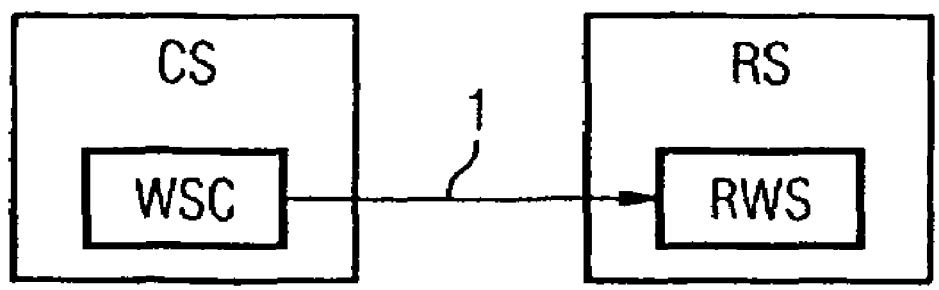
FIG. 1 shows a block diagram for requesting a remote Web service.

FIG. 1 shows a client system CS with a Web service client WSC. A remote system RS thus contains a remote Web service RWS. The Web service request 1, for instance SOAP or XML-RPC, is rerouted to the target and/or the remote Web service and is executed there.

Figure 2:
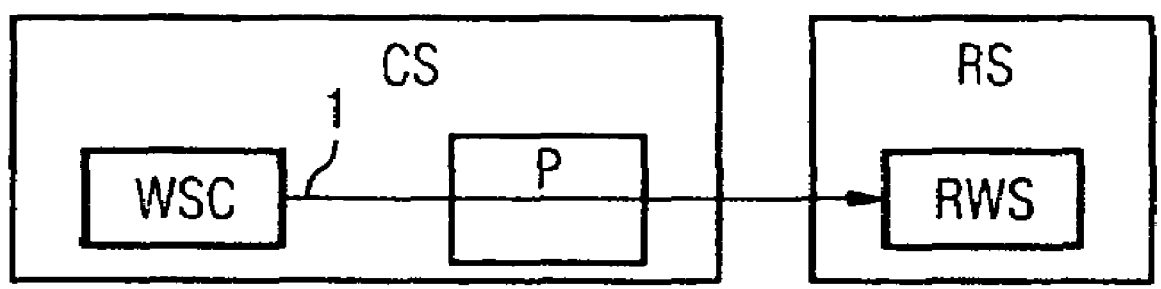
FIG. 2 shows a block diagram for requesting a Web service through a proxy server.

FIG. 2 shows a client system CS with a Web service client WSC. A remote system RS thus contains a remote Web service RWS. The Web service request 1, for instance SOAP or XML-RPC is sent transparently via a proxy server P. In this case, the Web service request 1 is also forwarded to the target and/or the remote Web service RWS and is executed there.

Figure 3A:
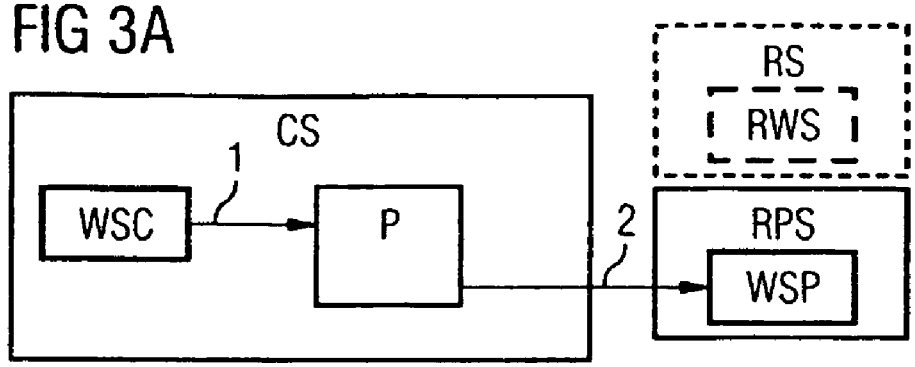
FIGS. 3a, 3b and 3c show block diagrams to illustrate requesting a Web service according to at least one embodiment of the invention via a transparent dynamic provision method through a proxy server.
Figure 3B:
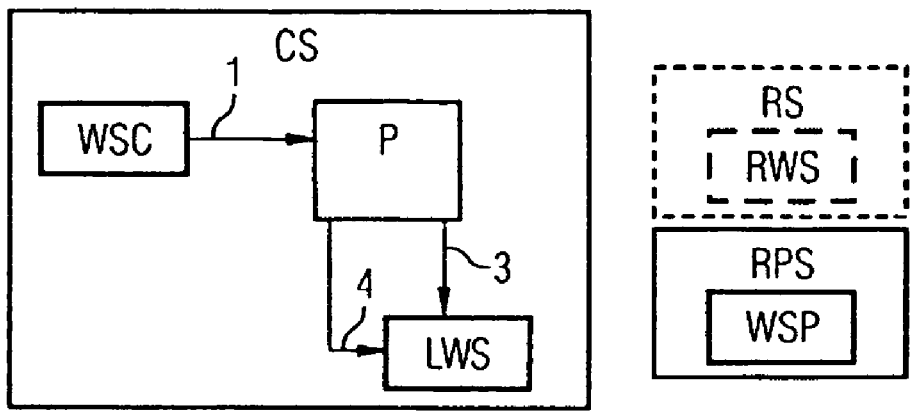
Figure 3C:
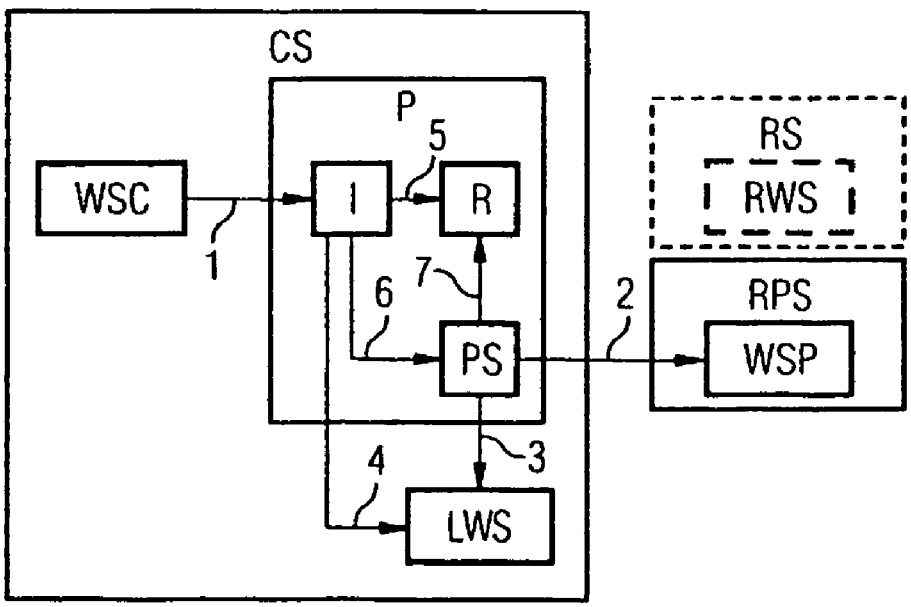

FIGS. 3a to 3c serve to illustrate the processes of at least one embodiment of the invention in more detail and show a client system CS with a Web service client WSC and from the standpoint of the Web service client, a target Web service RWS on the system RS, with the remote system RS and the Web service RWS nevertheless not taking part themselves here. Furthermore, a remote provision server RPS, e.g. a JNLP server, is available, which provides a Web service program WSP for downloading.

FIG. 3a thus displays a Web service request 1, for instance SOAP or XML-RPC, which is intercepted by a proxy server P and is not forwarded to the Web service RWS. Instead, a request 2, e.g. by JNLP, is sent to a remote provision server RPS, e.g. a JNLP server, in order to download the missing Web service program WSP. FIG. 3b shows the provision of the Web service program WSP as a local Web-service LWS within the client system CS via a request 3 of the proxy server P and the rerouting of the original request 1 to the local Web service LWS instead of to the service RWS by a corresponding request 4 of the proxy server P.

To this end, FIG. 3c shows, by way of example, a possible internal set up of the proxy server P, which allows the processes depicted in conjunction with FIGS. 3a and 3b. The request 1 is intercepted here by an interceptor I. The request 5 allows the interceptor I in the registry R to determine that this request is intended to be routed to a local instance and a local instance of the Web services is not yet provided.

A request 6 subsequently follows at a provision service PS, which downloads the Web service program WSP to the client system CS using the request 2, e.g. by a JNSP on a remote provision server RPS, e.g. JNLP server. The request 3 provides the Web service LWS locally and initiates it. A request 7 then registers LWS in R. Request 4 finally effects the adjusted rerouting and execution of the original request 1 on the local Web service LWS.

Figure 4A:
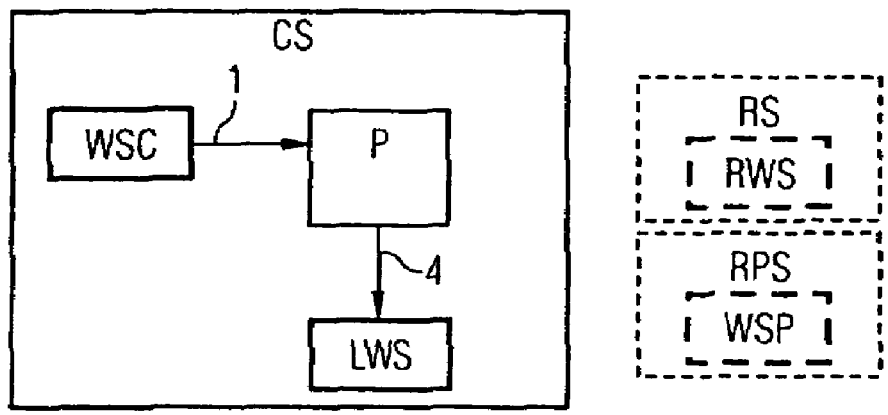
FIGS. 4a and 4b show block diagrams to illustrate rerouting of a Web service request according to at least one embodiment of the invention through a proxy server to an instance provided locally
Figure 4B:
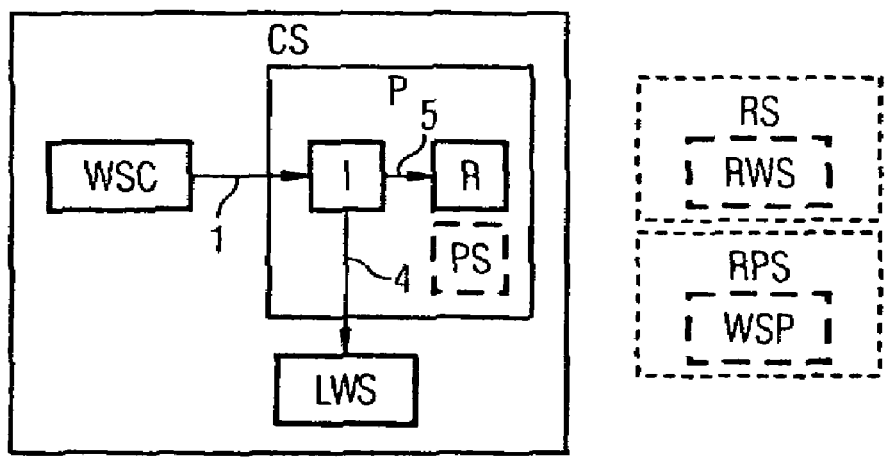

To illustrate an inventive aspect of at least one embodiment of rerouting of a Web-service request through a proxy server to a provided local instance, FIGS. 4a and 4b show a client system CS with a Web service client WSC and, from the standpoint of the one Web service client WSC, the target Web service RWS on a remote system RS. Here too a remote provision server RPS, e.g. a JNLP server, is available, which provides a Web service program WSP for the target Web service for downloading, with the remote server RS with the remote Web service RWS and the remote provision server RPS with the Web service program not however taking part.

The Web service request 1, for instance SOAP or XML-RPC, is intercepted for instance by the interceptor I, as shown in FIG. 3c, which then determines by request 5 in the registry R, that this request is intended to be rerouted to a local instance and that a local instance of the Web service is already provided in this case. The request 4 is again a modified forwarding and execution of the original request 1 on the LWS. The remote Web service RWS on the remote system RS is thus not used.

Figure 5:
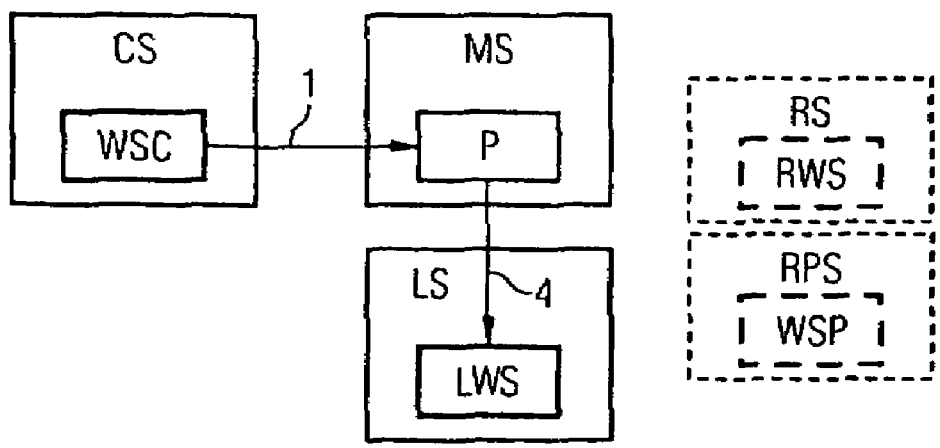
FIG. 5 shows a block diagram to illustrate a possible configuration of the various subscribers of the method.

As in FIG. 4a, FIG. 5 shows a possible configuration, with the proxy server P not however being in the client system CS, but instead on another server MS, and with the Web service LWS being located on a server LS and not on the client system CS.

Even parts of the proxy server P, e.g. of the interceptor I, the registry R and/or the provision service PS, can be distributed to various computers.

At least one embodiment of the invention is explained in exemplified form in more detail below.

A Web service program WSP is first implemented, in Java for instance. The Web service program WSP is downloaded and provided using the standard JNSP mechanism for setting up Java applications for example. A protocol interceptor mechanism is used if the HTTP transport protocol is used for SOAP, if an HTTP Proxy server P is configured to receive the outgoing HTTP-based SOAP requests. If another transport mechanism is used, for instance a message oriented middleware (MOM), the interceptors are then placed accordingly in order to receive the SOAP messages.

An interceptor I is used for instance to analyze the SOAP requests. An assignment unit or a registry R, possibly contained in interceptor I, can serve to analyze the SOAP-URL (Uniform Resource Locator) in order to determine whether a dynamic provision is desired and necessary and to assign the URL of the Web service RWS to the URL of the JNLP computer RPS.

If a dynamic provision is desired and necessary, the JNLP computer RPS is used to download the Web service program WSP via JNLP, and to initiate it locally for instance, referred to here as LWS. The URL of the endpoint in the SOAP message is adjusted transparently, in other words unnoticed by the Web service client, so as to reproduce the new up-to-date provision point of LWS and is executed there.

The principal advantage here is that the Web service can be provided transparently and dynamically locally from the user's standpoint and the performance and reliability, e.g. offline-mode, of a Web service-based application can thereby be improved.

Another advantage is that of increased flexibility, e.g. in the selection of the provision location according to different strategies and algorithms, e.g. dynamically in accordance with computers with free resources and close to Web service clients to avoid network latency. Web services do not have to be constantly available for execution in advance and no decision has to be taken in advance as to which computers would be best suited before the client makes the request and makes available better information.

Further advantages stem from the fact that the proxy mechanism allows Web service clients and Web service-based applications which use any kind of Web service toolkits can employ Java, .NET and other programming environments for example that the provision of the Web service is executed transparently and the SOAP requests can be adjusted during transition to another resume location, a URL for instance, and in this case JNLP as a standard mechanism in Java for resuming Web service programs can be used.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for transparent dynamic provision of a Web service, comprising:

making a client system with a Web service client and, from the standpoint of the Web service client, a target Web service available on a remote system, wherein the remote system and the target Web service do not, themselves, take part in making the client system and the target Web service available on the remote system;

making a remote provision server device available which provides a Web service program for the target Web service for downloading;

intercepting, by a proxy server device, an original Web service request directed to the remote system such that the request is not forwarded to the target Web service, a load request being sent instead to the remote provision server device in order to download the Web service program to the client system, provided it is not yet available on at least one of the client system and a further system close to the client system;

providing and initiating, via a load request of the proxy server device, the Web service program as a local Web service within the client system, provided that it is not yet available on the client system; and effecting a rerouting and adjustment of the original request on the local Web service via a new service request of the proxy server device.

2. The method according to claim 1, wherein: the original request is intercepted by an interceptor, the interceptor determines, using a determination request in a registry, whether the request is to be rerouted to a local instance and whether a local instance of the Web service is at least one of not yet and already provided, a provision request takes place at a provision service, which, on its part with the load request at the remote provision server device, downloads the Web service program onto the client system, provided it is not yet available on at least one of the client system and a further system close to the client system, and a registration request registers the local instance in the registry.

3. The method according to claim 2, wherein the original Web service request is at least one of an SOAP and XML RPC request.

4. The method according to claim 2, wherein the load request is sent to a remote provision server device via JNLP and wherein the remote provision server device is a JNLP server.

5. The method according to claim 1, wherein the original Web service request is at least one of an SOAP and XML RPC request.

6. The method according to claim 5, wherein the load request is sent to a remote provision server device via JNLP and wherein the remote provision sewer device is a JNLP server.

7. The method according to claim 1, wherein the load request is sent to a remote provision server device via JNLP and wherein the remote provision server device is a JNLP server.

8. The method according to claim 1, wherein no Web service request is sent from the proxy server device to the remote system to which the original Web service request is directed.

9. An array for transparent dynamic provision of a Web service, comprising:
a client system with a Web service client and, from the standpoint of the Web service client, a target Web service, available on a remote system, wherein the remote system and the target Web service do not, themselves, take part in making the client system and the target Web service available on the remote system,
a remote provision server device, which provides a Web service program for the target Web service for downloading, and
a proxy server device to intercept an original Web service request directed to the remote system and, without forwarding the original Web service request to the remote system, send a load request to the remote provision server device in order to download the Web service to the client system, provided the program is not yet available on at least one of the client system and a further system close to the client system, and wherein the Web service program is provided and initiated as a local Web service within the client system via a provision request of the client system on a further system close to the client system, and wherein via a new service request of the proxy server device, a forwarding of the original request is effected on the local Web-service.

10. The method according to claim 9, wherein no Web service request is sent from the proxy server device to the remote system to which the original Web service request is directed.

11. A method for dynamic provision of a Web service, in which a client system with a Web service client and a target Web service are remotely available, the target web service being available on a remote system, and in which a remote provision server device is available which provides a Web service program for the target Web service for downloading, the method comprising:
intercepting, by a proxy server device, an original Web service request directed to the remote system;
sending a load request, in place of the intercepted request, to the remote provision server device to download the Web service program to the client system, upon the program being unavailable on at least one of the client system and a further system close to the client system;
providing and initiating, via a load request of the proxy server device, the Web service program as a local Web service within the client system, upon the program being unavailable on at least one of the client system and a further system close to the client system; and
effecting a rerouting and adjustment of the original request on the local Web service via a new service request of the proxy server device.

12. The method according to claim 11, wherein:
the original request is intercepted by an interceptor,
the interceptor determines, using a determination request in a registry, whether the request is to be rerouted to a local instance and whether a local instance of the Web service is at least one of not yet and already provided,
a provision request takes place at a provision service, which, on its part with the load request at the remote provision server device, downloads the Web service program onto the client system, provided the program is not yet available on at least one of the client system and a further system close to the client system, and
a registration request registers the local instance in the registry.

13. The method according to claim 11, wherein the original Web service request is at least one of an SOAP and XML RPC request.

14. The method according to claim 11, wherein the load request is sent to a remote provision server device via JNLP and wherein the remote provision server device is a JNLP server.

15. The method according to claim 11, wherein no Web service request is sent from the proxy server device to the remote system to which the original Web service request is directed.

* * * * *